United States Patent
Hirasawa (10) Patent No.: US 7,376,061 B2
(45) Date of Patent: May 20, 2008

(54) REPRODUCING APPARATUS, REPRODUCING METHOD, AND CONTENTS RECORDING METHOD

(75) Inventor: Tsutomu Hirasawa, Saitama (JP)

(73) Assignee: Sony Corporation, Tokyo (JP)

( * ) Notice: Subject to any disclaimer, the term of this patent is extended or adjusted under 35 U.S.C. 154(b) by 619 days.

(21) Appl. No.: 11/002,126

(22) Filed: Dec. 3, 2004

(65) Prior Publication Data

US 2005/0169137 A1 Aug. 4, 2005

(30) Foreign Application Priority Data

Dec. 19, 2003 (JP) .............................. 2003-423459
Nov. 18, 2004 (JP) .............................. 2004-334364

(51) Int. Cl.
*G11B 7/00* (2006.01)

(52) U.S. Cl. .............................. 369/53.21; 369/47.27; 369/59.25

(58) Field of Classification Search ............. 369/47.27, 369/53.21, 47.48, 47.46, 47.21, 53.22
See application file for complete search history.

(56) References Cited

U.S. PATENT DOCUMENTS 6,882,608 B2 * 4/2005 Watanabe et al. ........ 369/47.32

* cited by examiner

*Primary Examiner*—Nabil Hindi
(74) *Attorney, Agent, or Firm*—Oblon, Spivak, McClelland, Maier & Neustadt, P.C.

(57) ABSTRACT

In the reproducing apparatus of the present invention, only such audio data which is recorded on a first recording area among audio data recorded on a recording medium is reproduced, linked to recording data recorded on a second recording area.

11 Claims, 9 Drawing Sheets

FIG. 1

| Audio file format | Image file format |
| --- | --- |
| ATRAC | JPEG, GIF, TIFF |
| ATRAC3 | JPEG, GIF, TIFF |
| ATRAC3plus | JPEG, GIF, TIFF |
| | |

FIG.2

| Audio file name | Start time information | End time information | Image file name |
|---|---|---|---|
| music_1 | 0:05:10 | 0:08:03 | pic 1.jpg |
| | 0:10:00 | 0:10:55 | pic 2.jpg |
| | 0:13:20 | 0:19:33 | pic 4.jpg |
| | 0:19:34 | 0:21:00 | pic 3.jpg |
| | ... | ... | ... |

REPRODUCING APPARATUS, REPRODUCING METHOD, AND CONTENTS RECORDING METHOD

BACKGROUND OF THE INVENTION

1. Field of the Invention

The present invention relates to reproducing and recording in which audio data encoded according to a predetermined encoding system are recorded on a predetermined first area, and audio data and recording data are reproduced, linked with the recording data recorded in a second recording area, with respect to only those audio data among audio data recorded on a recording medium that are recorded on the first recording area.

This application claims priority of Japanese Patent Application No. 2003-423459, filed on Dec. 19, 2003 and Japanese Patent Application No. 2004-334364, filed on Nov. 18, 2004, the entireties of which are incorporated by reference herein.

2. Description of Related Art

In recent years, techniques for larger volumes have been being developed regarding recording media like discs. It has also been demanded that various types of data such as audio data and computer-use data can be freely recorded/reproduced on/from one medium. Regarding developments of general-purpose media, however, compatibility and consistency with conventional recording/reproducing apparatuses are both important. From physical viewpoints, it is desirable that conventional resources should be used effectively.

Mini Discs (MD (registered trademark)) which are widely used at present are, as well known, magneto-optical discs having a diameter of 64 mm and are capable of recording/reproducing music audio data and the like. In mini discs, audio data are recorded with the data amount compressed to $\frac{1}{5}$ to $\frac{1}{10}$ according to ATRAC system. In case of audio data, for example, a mini disc can record data for 80 to 160 minutes.

Since mini discs for audio data are easily available for users, it will be very convenient if mini discs can be used even for other purposes than music, e.g., as data storage media for computers and the like. However, the recording capacity is as small as 160 MB or so, and no area is prepared for recording copyright protection information such as ID or the like specific to each medium. A problem hence arises in that mini discs cannot meet the demands for copyright protection of distributed contents, supposing use as versatile data storages for music/video distributions. Besides, mini discs adopt a management system (PTOC (Premastered Table Of Contents) or UTOC (User Table Of Contents)) based on a specific management area other than audio data recording areas. This makes it difficult for mini discs to meet the purpose for use with a general-purpose file system, such as FAT system or the like.

Further, if data other than audio data are recorded on tracks under management of the UTOC, problems occur in many audio devices (MD players), e.g., abnormal noise are heard while reproducing audio data. That is, supposing that mini discs for audio are used as general-purpose storage media, there have been problems of the recording capacity, management system, special information concerning copyright protection, noise in use with conventional devices, etc.

For the mini disc system, a disc standard called "MD DATA" or "MD CLIP" has been developed for the purpose of recording data other than audio data. The "MD DATA" standard, however, is for an exclusive use different from the audio MD and cannot be used unless the recording/reproducing apparatus is exclusively compatible with the "MD DATA". In addition, the recording capacity is 140 MB or so. In these respects, the "MD DATA" standard does not satisfy the demands as described above. On the other side, the "MD CLIP" enables use of audio MDs and uses an inner peripheral part of the MD which is out of the UTOC management. This standard therefore involves no drawbacks in use with conventional audio devices. Use of this standard, however, has naturally been limited because of its small recording area for general-purpose data, which is only 2 MB or so.

Hence, modifications are made by narrowing the track pitch to change the linear speed, the modulation system, or the like in order to realize a high density of recording data. Further, a secret area (secure area) which is usable upon authentication is provided in addition to a normal recording area. New-generation mini discs have been proposed while thus solving the drawbacks as described above. In case of a next-generation mini disc, data such as music contents, video contents, and the like which have copyrights are recorded on the secure area in a predetermined format. The data can be reproduced from the secure area only by a device which is allowed to refer to this area.

Conventionally, video data and audio data can be linked regardless of file formats, for example, like the case of a music CD with image data. Between plural databases of different kinds, data items of plural input files, conditions for linking file formats and the input files, and data items of output files containing results of linking, and definition files for defining the file formats are read. A record area of the output files is then created on a memory, and plural input files as targets are read according to the layout of the area. The input files as targets are stored into the record area, to create output files. Thus, techniques for biding data between databases of different kinds have been proposed (see, for example, Patent Document 1: Japanese Patent Application Laid-Open Publication No. 2000-259461).

However, compression-coding formats have become diverse. Data coded on the basis of a kind of compression-coding format can be unsupported by a kind of device. Particularly in case of the next-generation mini disc as described above, music data compression-coded on the basis of a predetermined format are recorded on a secure area which requires authentication. The other music data are recorded on a non-secure area. Therefore, linking between music data and image data created by a recording/reproducing device compatible with the next-generation mini disc standard cannot be reproduced by another device or only the music data can be reproduced. In this case, contents after the linking become data incompatible between these devices. Even if copyright protection of data to be recorded is realized by preparing a secure area as described above, there is a problem that the data can be treated as data which cannot be protected when the data are linked with other data.

The present invention hence has an object of providing a contents-reproducing apparatus and a contents-reproducing method as well as a contents-recording apparatus and a contents-recording method, which allow image data to be linked to only specific data among plural different data created according to different formats.

SUMMARY OF THE INVENTION

To achieve the above object, according to an aspect of the present invention, there is provided a reproducing apparatus which reproduces data from a recording medium having a first recording area where audio data encoded by a predetermined encoding system is recorded and a second recording area where recording data is recorded, the apparatus comprising: a reading means for reading data recorded on the recording medium; a decoding means for decoding audio data encoded by the predetermined encoding system; a storage means for storing an encoding format of the audio data recorded on the first recording area and a data format of the data recorded on the second recording area, with the encoding format and the data format being linked to each other, and with the data recorded on the second area being allowed to be reproduced with respect to the encoding format when the audio data recorded on the first recording area is reproduced; and a control means for reading the encoding format of the audio data only when the audio data read from the recording medium is read from the first recording area, with the data recorded on the second area being allowed to be reproduced during reproducing of the audio data, and reading and reproducing, from the second area, the data linked to the audio data read from the first area if the audio data is audio data for which the data recorded on the second recording area is allowed to be reproduced during reproducing of the audio data.

Further, according to another aspect of the present invention, there is provided a reproducing method of reproducing data from a recording medium having a first recording area where audio data encoded by a predetermined encoding system is recorded and a second recording area where recording data is recorded, wherein an encoding system of specified audio data is detected only when reproducing of audio data from the first recording area is specified, whether or not the recording data recorded on the second recording area is allowed to be reproduced linked with reproducing of the audio data recorded on the first recording area is determined with respect to the detected encoding system, and the specified audio data from the first recording area is reproduced and the recording data recorded on the second recording area is reproduced, linked with the reproducing of the audio data, if it is determined that the recording data recorded on the second recording area is allowed to be reproduced linked with the reproducing of the audio data recorded on the first recording area, with respect to the detected encoding system.

According to further another aspect of the present invention, there is provided a reproducing apparatus which reproduces data recorded on a first recording area in a recording medium having the first recording area where audio data encoded by a predetermined encoding system is recorded, a second recording area where recording data is recorded and audio data can be recorded, and a management data recording area where management data which manages recording on the first recording area and on the second recording area is recorded, the apparatus comprising: a reading means for reading, from the recording medium, the management data and recording data recorded on the recording medium; an audio decoding means for decoding the audio data read from the first recording area; an image data decoding means for decoding image data read from the second recording area; a storage means for storing a decoding system of the audio data recorded on the first recording area, with the audio data of the decoding system allowed to be reproduced while the image data recorded on the second recording area is decoded and reproduced by the image data decoding means; and a control means for performing control to read, decode, and reproduce the audio data recorded on the first recording area by the audio decoding means when the image data recorded on the second recording area is reproduced, only if the storage means instructs reproducing of audio having the audio data format which is allowed to be reproduced during the reproducing of the image data.

According to further another aspect of the present invention, there is provided a recording method of recording, on a recording medium, audio data and relevant data which is reproduced in synchronization with reproducing of the audio data, wherein: inputted audio data is recorded on a predetermined first recording area of the recording medium when audio data encoded by a predetermined encoding format is inputted; whether or not the encoding system applied to the audio data recorded on the first recording area is allowed to be linked to recording data recorded on a second recording area different from the first recording area is determined; and the audio data recorded on the first recording area is linked to the recording data recorded on the second recording area.

DETAILED DESCRIPTION OF THE PREFERRED EMBODIMENTS

This embodiment will now be described with reference to the case where the embodiment is applied to a recording medium according to a mini disc (registered trademark) as a disc-shaped magneto-optical recording medium. Exemplified as the specific embodiment of the present invention is a contents recording/reproducing apparatus which reproduces contents data from a recording medium which records plural different data created in different formats and contents data including image data. Mini discs reproducible by this contents-reproducing apparatus are capable of dealing with, for example, different data created in different formats, such as audio data, PC data, and the like. The mini discs each have a secret area usable upon authentication and a normal recording area usable without authentication. The secret area is capable of recording only particular data such as music contents, video contents, and the like, which have copyrights. In the present embodiment, audio data according to the ATRAC (registered trademark) format are treated as the particular data recordable on the secret area. Audio data other than data according to the ATRAC format, such as MP3 (MPEG1 Audio Layer 3) format, WMA (Windows (registered trademark) Media Audio) format, image data, text data, and the like are recorded on a normal recording area. Details of a mini disc having a secret area and a normal recording area will be described later.

The contents recording/reproducing apparatus 1 exemplified thus as a specific embodiment of the present invention will now be schematically described with reference to FIG. 1. The contents recording/reproducing apparatus 1 is capable of reproducing data from a recording medium 90 which is exemplified by a mini disc which records contents data including plural different data created in different formats and image data. The contents recording/reproducing apparatus 1 is constituted by a data recording/reproducing control unit 2 which performs recording/reproducing of data on/from the recording medium 90, input/output of audio data, and data transfer to externally connected devices, and an image processing unit 3 which obtains and displays image data. The data recording/reproducing unit 2 includes: a recording/reproducing unit 4 which performs recording/ reproducing of data on/from the recording medium 90; an audio data input unit 5 which is inputted with audio data through a microphone or the like; an audio data output unit 6 which outputs audio data to headphones or the like; an audio data processing unit 7 which performs an encode processing on inputted audio data as well as a decode processing on audio data to be outputted; an external interface unit 8 for performing data transfer to externally connected devices; a control unit 9 which controls the operation of the contents recording/reproducing apparatus 1; a link information memory 10 which stores the correspondence between an image data format and an audio data format which is allowed to be linked to the image data format, among audio data formats recorded on the recording medium 90; and an input operation unit 11 to which user's operations are inputted. The image processing unit 3 includes: an image obtaining unit 12 which obtains images by an image pickup device; a display unit 13 which displays images obtained by the image obtaining unit 12 and images recorded on the recording medium 90; and an image data control unit 14 which controls procedures of obtaining image and of displaying images, based on control from the control unit 9.

A supplemental description will now be made concerning the recording medium 90. In a predetermined area of the recording medium 90 which is not accessible during a normal data-reproducing operation, an ID code is recorded as identification information which is unique to the recording medium. Depending on the types of recording media, ID codes are generated arbitrarily as erasable information by a recorder in some cases or are recorded with overwrite inhibited at the time of factory shipment in other cases.

Figure 2:
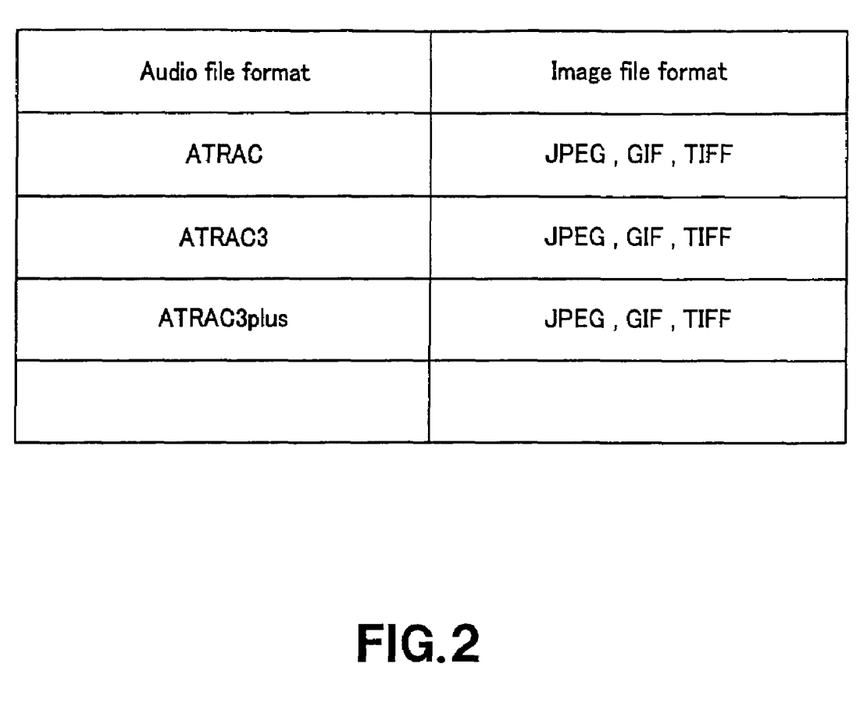
FIG. 2 is a table showing link information describing correspondence to image data linkable to audio formats in the contents recording/reproducing apparatus.

In the contents recording/reproducing apparatus 1 described in the present embodiment, audio data are recorded in the secret area and image data are recorded on the normal recording area. Therefore, as shown in FIG. 2, link information stored in the link information memory 10 is suggested as a correspondence table which shows that image data based on the JPEG format, GIF format, TIFF format, and the like are linkable to data according to formats of the ATRAC format family, e.g., the ATRAC (Adaptive Transform Acoustic Coding) system, ATRAC3 system, and ATRAC3 plus system. Further, the reproducing control unit 4 reproduces image data linked to audio data allowed to be linked on the basis of link information.

That is, in the contents recording/reproducing apparatus 1, audio data of the MP3 format, WMA format, or the like other than the ATRAC format family are recorded on the normal recording area. These audio data recorded on the normal recording area cannot be linked to image data recorded on the normal recording area. Link information indicates the linkages between audio data recorded on a secret area and image data recorded on the normal recording area. There is additionally provided a tiring table which indicates timings at which linkable image data are linked to audio data.

Figure 3:
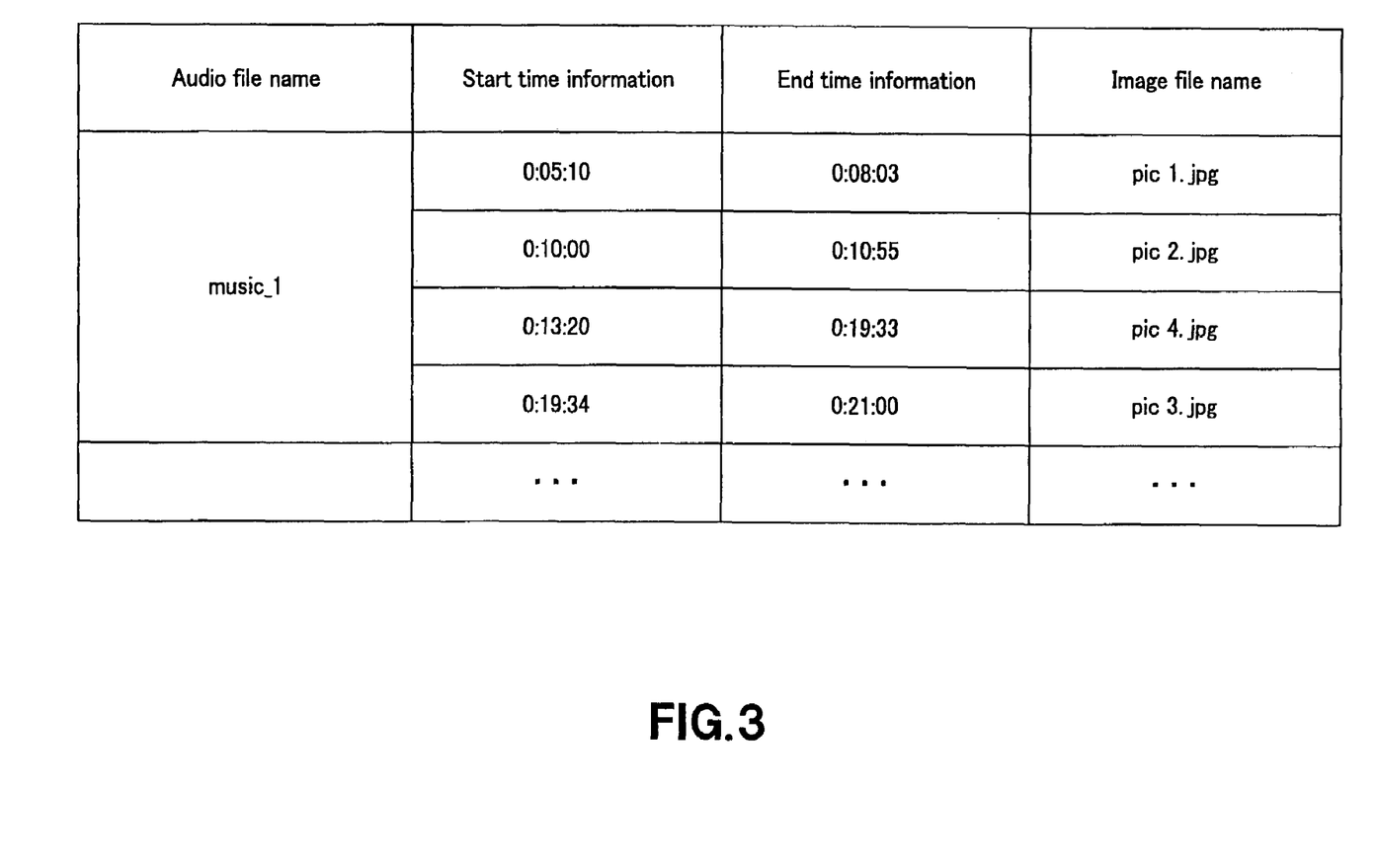
FIG. 3 shows a link timing table describing the timing at which image data files are linked to a linkable audio file.

FIG. 3 shows the link timing table. On the link timing table, audio file names and image file names are linked to each other. With respect to each audio file, time information indicative of time to start and stop displaying image data files is written. The time information is playback time information of an audio file.

However, audio files shown in the link timing table are audio files based on an ATRAC family format recorded on a secret area. Image data files to be thus linked are distinguished from data such as video contents which are dealt with as data to be recorded on the secret area. The link timing table is recorded on the secret area of the recording medium (mini disc) 90. Based on the link timing table, image data linkable to audio data are displayed at this timing in synchronization with the audio data.

In this embodiment, link information is stored in the link information memory 3 provided in the contents recording/ reproducing apparatus 1. However, link information may alternatively be recorded on the secret area of the mini disc 90, for example. The link timing table may alternatively be recorded on the normal recording area in the system in which the table need not be set in the secret area. Further, the link time table may be stored in the link information memory 10 of the contents recording/reproducing apparatus 1 together with the ID code which the recording medium 90 has. The ID code recorded on the recording medium 90 may be read when the recording medium 90 set in contents recording/reproducing apparatus 1 is detected. If the same ID code as read is then determined as existing in the link information memory 10, the link timing table stored together with the ID may be read from the link information memory 10 and used.

The embodiment of the contents recording/reproducing apparatus 1 will now be described with reference to FIG. 4. The same blocks as those in FIG. 1 will be denoted at identical reference symbols. The contents recording/reproducing apparatus 1 has a data recording/reproducing control unit 2 and an image processing unit 3. The data recording/ reproducing control unit 2 has a recording/reproducing unit 4, audio data input unit 5, audio data output unit 6, audio data processing unit 7, external interface unit 8, control unit 9, link information memory 10, input operation unit 11, memory transfer controller 15, buffer memory 16, supplemental memory 17, and image data processing unit 21. The image processing unit 3 has an image obtaining unit 12, display unit 13, and image data control unit 14. Further, the external interface unit 8 of the data recording/reproducing control unit 2 has a USB hub 18 and USB interfaces 19 and 20. The contents recording/reproducing apparatus 1 can be connected to a personal computer (PC) 100 and can use mini discs as audio data recording media. The contents recording/ reproducing apparatus 1 can also be used as an external storage for a PC or the like.

The recording/reproducing unit 4 in the contents recording/reproducing apparatus 1 performs recording and/or reproducing with respect to a loaded recording medium 90 such as a mini disc or the like. The internal configuration of the recording/reproducing unit 4 will be described with reference to FIG. 5.

The memory transfer controller 15 controls transfer/reception of reproducing data from the recording/reproducing unit 4 or recording data to be supplied to the recording/reproducing unit 4. The buffer memory 16 performs buffering of data read out in units of high-density data clusters from data tracks of the mini disc 90 by the recording/reproducing unit 4 under control of the memory transfer controller 15. The supplemental memory 17 stores various management information such as UTOC data and the like read from the mini disc 90 by the recording/reproducing unit 4, information for copyright protection which is recorded on the secret area, information for checking alterations to data, external device information for limitedly permitting access, and the like.

The control unit 9 is communicable with a PC 100 connected through the USB interface 20 and the USB hub 18. The control unit 9 performs control of the communication with the PC 100 to receive commands such as write requests, read requests, and the like from the PC 100 and transmit status information and other necessary-information to the PC 100. Also, the control unit 9 controls totally the whole contents recording/reproducing apparatus 1. When the mini disc 90 is loaded in the recording/reproducing unit 4, for example, the control unit 9 instructs the recording/reproducing unit 4 to read management information and the like from the management information recording area of the mini disc 90. The control unit 9 further makes the memory transfer controller 15 to store the read management information and the like of the PTOC, UTOC, or the like into the supplemental memory 17. The control unit 9 reads these management data and so can comprehend the track recording status of the mini disc 90.

When a read request concerning a given FAT sector issues from the PC 100, the control unit 9 supplies a control signal indicative of execution of reading of the data cluster which includes the FAT sector requested to be read to the recording/reproducing unit 4. The data cluster read by the recording/reproducing unit 4 is written into the buffer memory 16 by the memory transfer controller 15. However, if the FAT sector has already been stored in the data buffer memory 16, the recording/reproducing unit 4 need not read the data cluster. At this time, control is performed by the control unit 9 to supply a control signal for reading data of the requested FAT sector from data of the high-density data clusters written in the buffer memory 16 and to transmit the data to the PC 100 through the USB interface 20 and the USB hub 18.

When a write request concerning a given FAT sector issues from the PC 100, the control unit 9 also makes the recording/reproducing unit 4 execute reading of the data cluster which includes the FAT sector requested by the write request. The data cluster thus read is written into the buffer memory 16 by the memory transfer controller 15. However, if the data of this FAT sector has already been stored in the buffer memory 16, the recording/reproducing unit 4 need not read the data. Also, the control unit 9 supplies the FAT sector (recording data) transmitted from the PC 100 to the memory transfer controller 15 through the USB interface 20 and makes the controller 15 execute overwriting of the data of the corresponding FAT sector on the buffer memory 16. The control unit 9 further instructs the memory transfer controller 15 to transfer, as recording data, the data of the data cluster stored in the buffer memory 16 with a necessary FAT sector overwritten, to the recording/reproducing unit 4. At this time, the recording/reproducing unit 4 writes the recording data of the data cluster, according to the modulation system to which the mini disc as a loaded recording medium corresponds.

In the contents recording/reproducing apparatus 1 shown as this embodiment, the recording/reproducing control described above is used to record/reproduce data tracks. Data transfer to record/reproduce MD audio data to be recorded/reproduced on/from audio tracks is performed by the audio data processing unit 7. Image data obtained by the image obtaining unit 12 is recorded on the mini disc 90 by the image data control unit 14 if the image data is linkable according to link information as edited by a user. At this time, the control unit 9 creates a link tiring table and records the table on the mini disc 90. The image data to be recorded on the mini disc 90 is subjected to predetermined image encoding and thereby compressed, by the image data processing unit 21. Image data reproduced from the mini disc 90 is displayed by the display unit 13. The image data reproduced from the mini disc 90 is subjected to image data decoding by the image data processing unit 21, and thus, data expansion processing is performed. Also, the contents recording/reproducing apparatus 1 may be constructed to have an input terminal through which image data are inputted from the outside to the image data control unit 14 as well as an output terminal through which image data are outputted to the outside.

The audio data input unit 5 which is an input system for the audio data processing unit 7 comprises, for example, an audio signal input unit such as a line/microphone input circuit or the like, an A/D converter, and a digital audio data input unit. The audio data processing unit 19 comprises an ATRAC-compression encoder/decoder and a buffer memory for compressed data. Further, the audio output unit 6 which is an output system for the audio data processing unit 7 comprises, for example, a digital audio data output unit, a D/A converter, and an analog audio signal output unit such as a line/headphones output circuit or the like.

The first route through which audio tracks are recorded on the mini disc 90 as a recording medium is the case that digital audio data or digital audio signals obtained by performing signal conversion on analog audio signals by the A/D converter of the audio data input unit 5 are inputted to the audio data processing unit 7. Linear PCM digital audio data inputted directly or obtained by converting inputted analog audio signals by the A/D converter is subjected to ATRAC compression encoding and stored in the buffer memory 16. Thereafter, the data is read out from the buffer memory 16, at predetermined timing in units of data each of which is equivalent to an ADIP cluster, and is then transferred to the recording/reproducing unit 4. The recording/reproducing unit 4 modulates the transferred compressed data in accordance with the EFM modulation system or RLL (1-7) PP modulation system and writes the modulated data as audio tracks into the secret area of the mini disc 90. A second case in which audio tracks are recorded on the mini disc 90 as a recording medium is the case that audio data which is allowed to be recorded on the secret area is inputted from the personal computer 100. In this case, whether recording of data to be recorded as audio data onto the secret area of the recording medium 90 is permitted is checked via the USB hub 18 and USB interface 20 between the personal computer 100 and the control unit 9. If it is recognized that recording of the data onto the secret area of the recording medium 90 is permitted, the control unit 9 issues an instruction that specified audio data inputted to the memory transfer controller 15 from the personal computer 100 should be recorded onto the secret area of the recording medium 90 by the recording/reproducing unit 4. If recording onto the recording medium 90 is permitted, the personal computer 100 transfers the audio data file to the memory transfer controller via the USB hub 18 and USB interface 19. The transferred audio data file is then temporarily stored into the buffer memory 16. Thereafter, the data is read from the buffer memory 16 and transferred to the recording/reproducing unit 4, at predetermined timing, for example, in units of data each of which is equivalent to an ADIP cluster. The recording/reproducing unit 4 modulates the transferred compressed data in accordance with the EFM modulation system or RLL (1-7) PP modulation system, and then writes the data as audio tracks into the secret area of the mini disc 90. Image data used as a linked image and music data compressed in accordance with any other system than the ATRAC are written as general data into the normal recording area.

To reproduce an audio track recorded on the secret area from the mini disc 90, the recording/reproducing unit 4 demodulates the data to be reproduced, into an ATRAC compressed state, and transfers the data to the audio data processing unit 7. The audio data processing unit 7 performs ATRAC compression decoding on the audio data subjected to ATRAC encoding and reproduced from the recording medium 90, to obtain linear PCM audio data thereof The audio data processing unit 7 outputs the linear PCM audio data as digital data through the audio data output unit 6. Alternatively, the data is converted into analog audio signals by the D/A converter and is outputted in the form of a line output or a headphones output.

Figure 4:
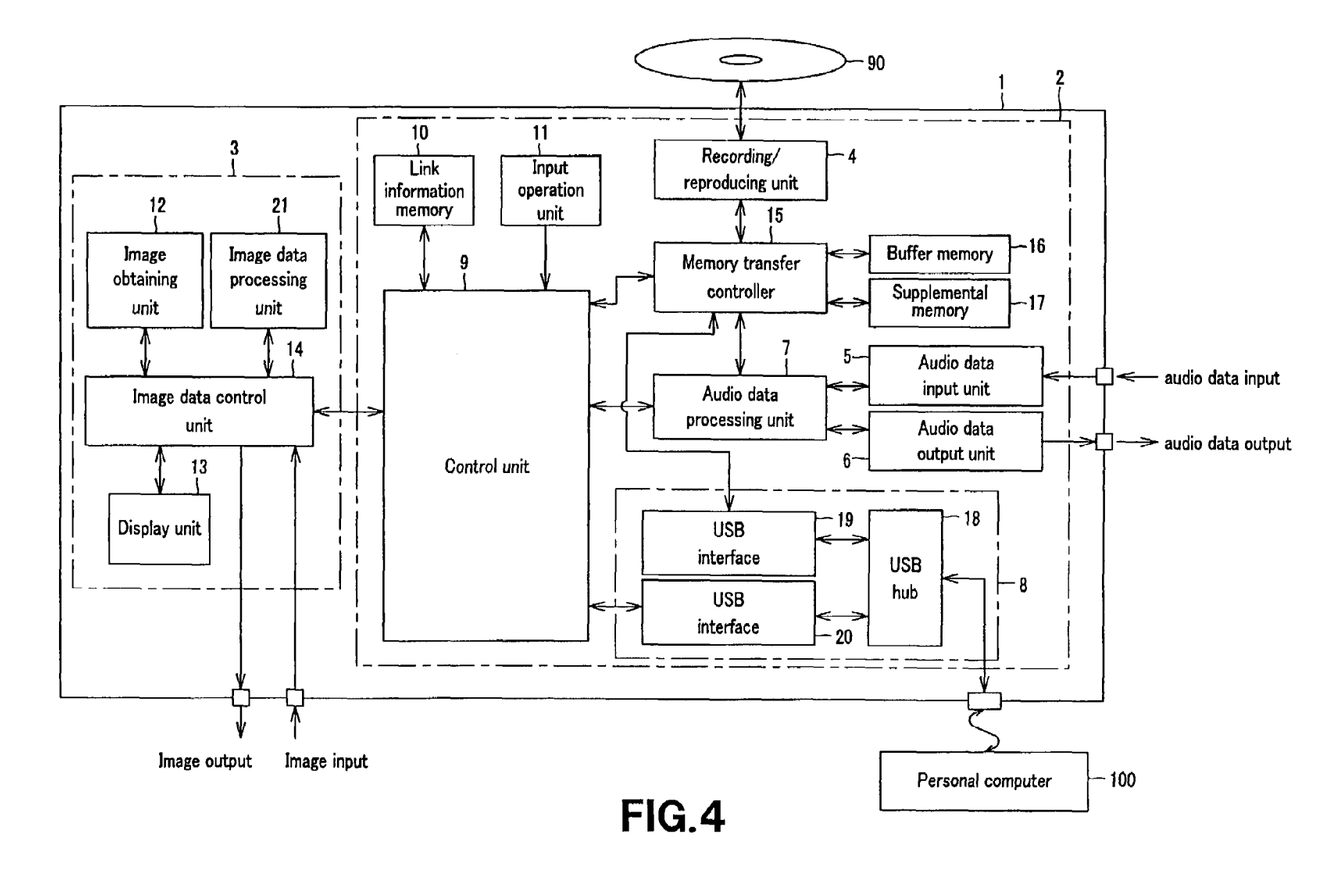
FIG. 4 is a diagram which depicts the configuration of the contents recording/reproducing apparatus.

The configuration shown in FIG. 4 is no more than an example. For example, the audio data processing unit 7 is unnecessary if the contents recording/reproducing apparatus 1 is connected to the PC 100 and used as an external storage which records/reproduces data tracks only. On the other side, if recording/reproducing of audio signals is a main object, it is desirable to comprise the audio data processing unit 7 and a display unit as a user interface. The connection to the PC 100 is not limited to the USB type but may be a so-called IEEE1394 interface according to the standard defined by the IEEE (Institute of Electrical and Electronics Engineers, Inc.) or any other general-purpose connection interface.

Subsequently, the peripheral structure of the recording/reproducing unit 4, the audio data processing unit 7, the audio data input unit 5 and the audio data output unit 6 in the contents recording/reproducing apparatus 1 will now be described in details with reference to FIG. 5. In the contents recording/reproducing apparatus 1 according to the present invention, image data is reproduced linked with data to which linking is permitted, based on link information indicative of formats which are allowed to be linked to predetermined image data, among plural data created in different formats in a mini disc in which a secret area and a normal recording area are dynamically created. Particularly in this case, the link information is a correspondence table showing those formats that are allowed to be linked to image data from audio data recorded on a secret area, among plural different data created in different formats.

The recording/reproducing unit 4 shows a recording processing system which performs recording/reproducing on/from the conventional mini disc 90. The recording/reproducing unit 4 has a structure capable of EFM modulation/ACIRC encoding which is a conventional recording systems. The recording/reproducing unit 4 also has a structure capable of performing EFM demodulation/ACIRC decoding to reproduce data from the mini disc 90. A media drive unit 11 is driven to rotate a loaded mini disc 90 by a spindle motor 31 according to the CLV or ZCAV system. During recoding/reproducing, a laser beam is irradiated onto the mini disc 90 from an optical head 32.

The optical head 32 achieves a high-level laser output to heat recording tracks up to the Curie temperature during recording. During reproducing, the optical head 32 outputs a laser beam of a relatively low level to detect data from reflection light based on the magnetic Kerr effect. Therefore, the optical head 32 is provided with a laser diode as a laser output means, a polarizing beam splitter, an optical system including an objective lens and the like, and a detector for detecting reflection light. The objective lens provided in the optical head 32 is held to be able to shift in the radial direction of the disc and in directions in which the lens moves up to and apart from the disc, for example, by a two-axle mechanism.

In this embodiment, a phase compensation plate capable of optimizing the bit error rate during data reading is provided on the reading light path of the optical head 32, to be recordable/reproducible on/from mini discs of plural types whose media surfaces have respectively different physical specs and to obtain the maximum reproduction characteristics with respect to the all discs.

A magnetic head 33 is provided at the position opposed to the optical head 32 with the mini disc 90 interposed therebetween. The magnetic head 33 applies a magnetic field modulated according to data to be recorded, to the mini disc 90. Although not shown in the figures, a thread motor and a thread mechanism are provided to move the whole optical head 32 and magnetic head 33 in the radial direction of the disc.

This media drive unit 11 is provided with a recording processing system, a reproducing processing system, a servo system, and the like, in addition to the recording/reproducing head system including the optical head 32 and the magnetic head 33, and the disc drive system including the spindle motor 31. A section for performing EFM modulation and ACIRC encoding during recording onto the mini disc 90 is provided as the recording processing system. Further, a section for performing demodulation corresponding to the EFM modulation and ACIRC decoding during reproducing data from the mini disc 90 as the reproducing processing system.

Information detected as reflection light of the laser beam irradiated on the mini disc 90 from the optical head 32 (e.g., a photo-electric current obtained by detecting laser reflection light with use of a photo-detector) is supplied to an RF signal processing unit 34. The RF signal processing unit 34 performs current/voltage conversion, amplification, matrix calculation, and the like on the inputted detection information. Thus extracted are reproducing RF signals as reproducing information, tracking error signals TE, focus error signals FE, groove information (ADIP information recorded on the mini disc 90 by track-wobbling), and the like.

During reproduction from the mini disc 90, reproducing RF signals obtained by the RF signal processing unit 34 are processed by an EFM/ACIRC coding demodulation unit (EFM/ACIRC CODEC) 37 through an ADIP_PLL circuit 35 and an EFM_PLL circuit 36. Tracking error signals (Detrack), focus error signals (Defocus), and lens-shift signals (LensShift) which are outputted from the RF signal processing unit 34 are supplied to each servo signal processing circuits in rear stages. Groove information is supplied also to the ADIP_PLL circuit 35. The ADIP_PLL circuit 35 limits the band range of the groove information by a band pass filter, to extract wobble components. The ADIP_PLL circuit 35 then performs FM demodulation and bi-phase demodulation, to extract ADIP addresses. The groove information is returned to the servo signal processing circuit 46 for spindle servo control.

The reproducing RF signals are binarized by the EFM/ACIRC coding demodulation unit 37 into EFM signal strings and are then subjected to EFM demodulation. Further, error correction and deinterleave processing are carried out for ACIRC demodulation. In case of audio data, the data are in form of ATRAC-compressed data at this time point. The demodulated ATRAC-compressed data are outputted, as reproduced data from the mini disc 90, to a DRAM 39 through a memory controller 38. This data is then subjected to ATRAC decoding by the ATRAC-coding decoding unit (ATRAC CODEC) 40, and outputted through an output unit 43 such as headphones or a loudspeaker via an AD/DA converter 41 and an amplifier 42. The contents recording/reproducing apparatus 1 obtains external sounds via a microphone 44, amplifier 45, and the AD/DA converter 41.

The servo signal processing circuit 46 generates, for example, a spindle error signal for CLV servo control and ZCAV servo control, based on an error signal obtained by integrating phase errors (or differences) from the reproducing clock (a PLL-based clock during decoding), with respect to groove information. The servo signal processing circuit 46 then supplies the spindle error signal to a drive circuit 50. The servo signal processing circuits 47, 48, and 49 generate various servo control signals (tracking control signals, focus control signals, thread control signals, spindle control signals, etc.), based on the tracking error signals, focus error signals, lens-shift commands, track jump commands, access commands, and the like. The circuits 47, 48, and 49 then output those signals to drive circuits 51, 52, and 53. That is, the servo signal processing circuits perform necessary processings such as a phase compensation processing, gain processing, target value setting processing, and the like, on servo error signals or commands as described above, to generate various servo control signals.

The drive circuits 50, 51, 52, and 53 generate predetermined servo drive signals, based on servo control signals supplied from the servo signal processing circuits. The servo drive signals are two-axle drive signals (of two kinds, i.e., in the focusing direction and in the tracking direction) for driving the two-axle mechanism, a thread motor drive signal for driving the thread mechanism, and a spindle motor drive signal for driving the spindle motor 31. By these servo drive signals, the focus control and tracking control are performed with respect to the mini disc 90, as well as the CLV control or ZCAV control with respect to the spindle motor 31.

Figure 1:
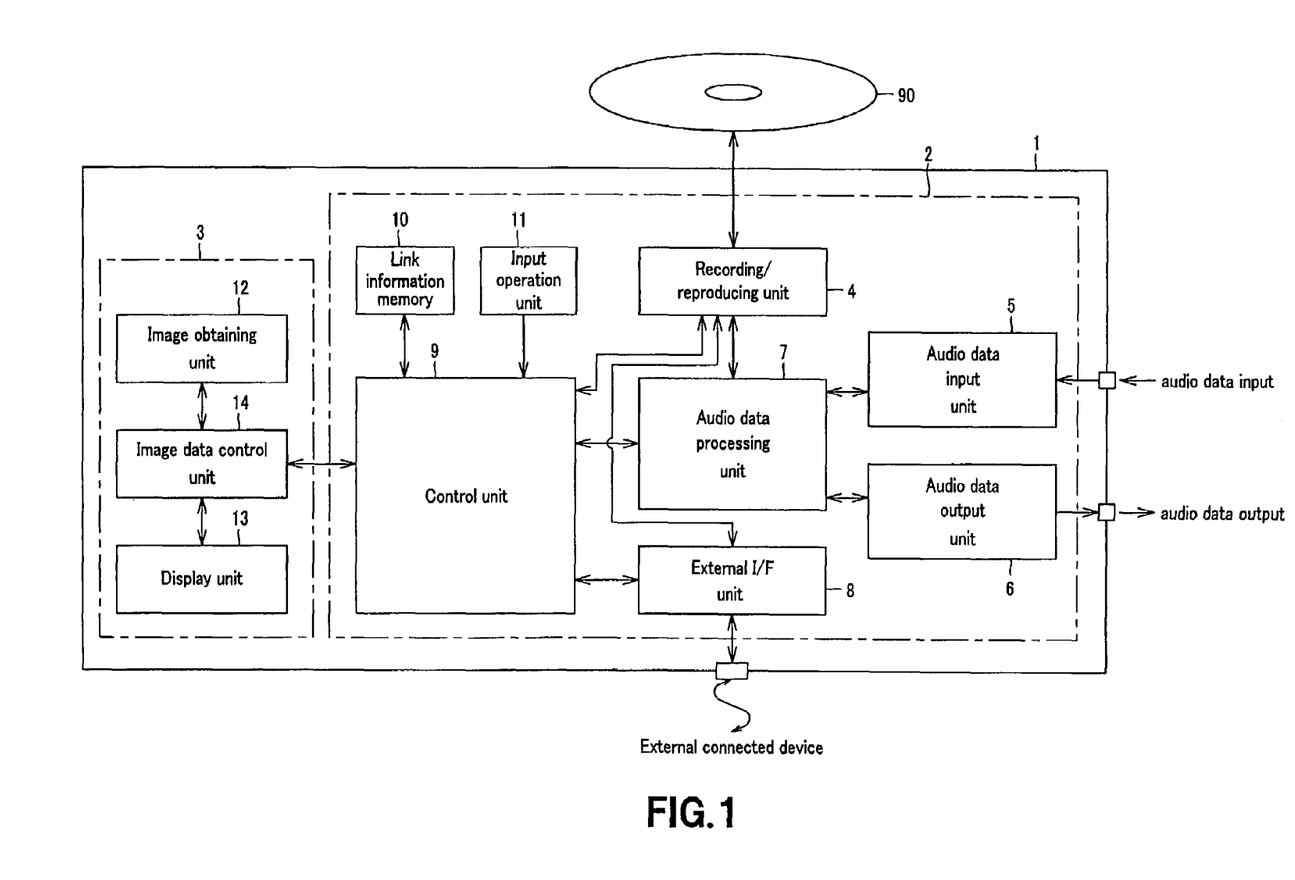
FIG. 1 is an explanatory diagram schematically showing the contents recording/reproducing apparatus suggested as an embodiment of the present invention.

To execute a recording operation on the mini disc 90, data from the memory transfer controller 15 as shown in FIG. 1 or normal ATRAC-compressed data from the audio data processing unit 19 are supplied. During recording on the mini disc 90, EFM/ACIRC coding demodulation unit 37 functions. In case of audio signals, compressed data from the audio data processing unit 19 are added with interleave and error correction codes by an ACIRC encoder, and are thereafter EFM-demodulated. The EFM-demodulated data are supplied to the magnetic head driver 54, and the magnetic head 33 applies a magnetic field to the mini disc 90, based on the EFM-modulated data. Thus, the demodulated data are recorded.

As shown in this embodiment, if a secret area and a normal recording area are created in the mini disc 90 and data to be recorded on the respective areas are predetermined, the system controller 18 instructs the media drive unit to have access based on a specified recording area which depends on whether data to be recorded/reproduced are audio tracks or data tracks. The contents recording/reproducing apparatus 1 may perform control such that either PC data or audio data are allowed to be recorded on the mini disc 90 loaded and recording of the other data than the allowed data is inhibited. That is, control may be carried out to prevent PC data and audio data from being mixed.

Next, a description will be made of the mini disc 90 which is usable in the contents recording/reproducing apparatus 1. Media applicable as the mini discs 90 in this embodiment are a recording medium which modifies the modulation system of a conventional magneto-optical disc, and a recording medium which achieves improved secrecy and a high-density recording capacity by applying a signal system different from a recording format conventionally used as a recording/reproducing system of a mini disc which adopts a conventional magneto-optical recording system.

This mini disc 90 adopts a high-density recording technique and a new file system to realize a certain recording capacity while keeping compatibility with conventional mini discs, the outer shape of the housing, and the recording/reproducing optical system. Secrecy can also be ensured providing a disc using a conventional magneto-optical recording system with an area for recording copyright protection information, information for checking alterations to data, other not-open information, and the like.

In the mini disc 90, a series of audio tracks and data tracks need not always be recorded physically sequentially on the disc but may be recorded, separated into plural parts. Parts mean sectors in each of which physically sequential recording is performed. That is, even when there are two PC data recording areas which are physically separate from each other, the number of data tracks may be considered to be one or may be considered to be plural.

In the following, an example of specs of a mini disc 90 will be described. At first, the specs of a conventional mini disc will be described. The physical format of a mini disc (and MD DATA) is defined as follows. The track pitch is 1.6 μm and the bit length is 0.59 μm/bit. The laser wavelength λ is λ=780 nm, and the aperture of the optical head is NA=0.45. The recording system adopts a groove recording system in which a groove (in the disc surface) is used as a track for recoding/reproducing. The addressing system is of a type using a wobbled groove in which a single spiral grove is formed in the disc surface and wobbles as address information are formed in both sides of the groove. In the present specification, an absolute address recorded as a wobble is also called ADIP (Address In Pregroove). Conventional mini discs adopt the EFM (8-14) modulation system as a modulation system for recording data. As an error correction system, the ACIRC (Advanced Cross Interleave Reed-Solomon Code) is used. Data interleaving of convolutional type is adopted. As a result of this, the redundancy of data is 46.3%. Conventional mini discs also adopt a data detection system of a bit-by-bit system, and adopts the CLV (Constant Linear Velocity) as the disc drive system. The linear velocity of the CLV is 1.2 m/s. The standard data rate during recording/reproducing is 133 kB/s, and the recording capacity is 164 MB (140 MB in case of MD DATA). The minimum rewrite unit (cluster) of data consists of 36 sectors which include 32 main sectors and 4 link sectors.

In contrast, among mini discs 90 used in the present embodiment, for example, a disc having a modulation system modified from that of a conventional mini disc has the same physical specs concerning its recording medium as those of conventional mini discs as described above. The track pitch is 1.6 µm, and the laser wavelength λ is λ=780 nm. The aperture of the optical head is NA=0.45. The recording system adopts the groove recording system. The addressing system uses the ADIP. Thus, the structure of the optical system in the disc drive device, the ADIP address read system, and the servo processing are the same as those of conventional mini discs, so that the compatibility with conventional discs are achieved. In addition, the present mini disc adopts the RLL (1-7) PP modulation system (RLL: Run Length Limited, PP: Parity preserve/Prohibit rmtr(repeated minimum transition runlength)) as a modulation system for recording data. As an error correction system, the RS-LDC (Reed Solomon-Long Distance Code) system with BIS (Burst Indicator Subcode) which has a higher correction capability. The data interleaving is of a block-complete type. As a result, redundancy of data is 20.50%. The data detection system adopts the Viterbi decoding system based on PR (1, 2, 1) ML.

In this case, the CLV system is also used as the disc drive system, and the linear velocity is 2.4 m/s. The standard data rate during recoding/reproducing is 4.4 MB/s. By adopting this system, the total recording capacity can be raised to 300 MB. Since the modulation system is thus changed from the EFM to the RLL (1-7) PP modulation system, the window margin is changed from 0.5 to 0.666. Therefore, a 1.33 times higher density can be realized. One cluster which is a minimum rewrite unit of data consists of 16 sectors equivalent to 64 kB. Thus, the recording modulation system is changed from the CIRC system to the RS-LDC system with BIS and a system using differences in the sector structure and the Viterbi decoding. Therefore, the data efficiency increases from 53.7 to 79.5%, so that a 1.48 times higher density is realized. As a total result of these factors, the recording capacity can increase to 300 MB which is twice the capacity of conventional mini discs. More specifically, the present mini disc 90 is a recording medium which adopts a high-density recording technique of a domain wall displacement detection (DWDD) system and so has a different physical format from that of conventional mini discs. The mini disc 90 has a track pitch of 1.25 µm and a bit length of 0.16 µm/bit and achieves a high density in the linear direction. To be compatible with conventional mini discs, the optical system, read system, servo processing, and the like are arranged according to conventional standards. The laser wavelength λ is λ=780 nm, and the aperture of the optical head is NA=0.45. The recording system adopts a groove recording system, and the addressing system uses the ADIP. The outer shape of the housing satisfies the same standard as conventional mini discs.

However, in order to read data at a narrower track pitch and a higher linear density (or a smaller bit length) than those of conventional mini discs, it is necessary to overcome constraint conditions such as cross-talk from detrack margins, rands, and a groove, cross-talk of wobbles, focus errors, CT signals, and the like. Therefore, the depth, inclination, and width of the groove are changed in the mini disc 90. More specifically, the groove has a depth of 160 nm to 180 nm, an inclination of 60 to 70°, and a width of 600 to 800 nm.

Further, in case of a mini disc 90 which adopts a signal system different from the recording format conventionally used, RLL (1-7) PP modulation system (RLL: Run Length Limited, PP: Parity preserve/Prohibit rmtr (repeated minimum transition runlength)) is adopted as a modulation system for recording data. As an error correction system, the RS-LDC (Reed Solomon Long Distance Code) system with BIS (Burst Indicator Subcode) which has a higher correction capability is used. Data interleaving is of a block-complete type. As a result, redundancy of data is 20.50%. The data detection system adopts the Viterbi decoding system based on PR (1, 1) ML. One cluster which is a minimum rewrite unit of data consists of 16 sectors equivalent to 64 kB.

The ZCAV system is adopted as the disc drive system in this case, and the linear velocity is 2.0 m/s. The standard data rate during recording/reproducing is 9.8 MB/s. Since the mini disc 90 thus adopts the DWDD system and this drive system, the total recording capacity reaches 1 GB or so.

Figure 5:
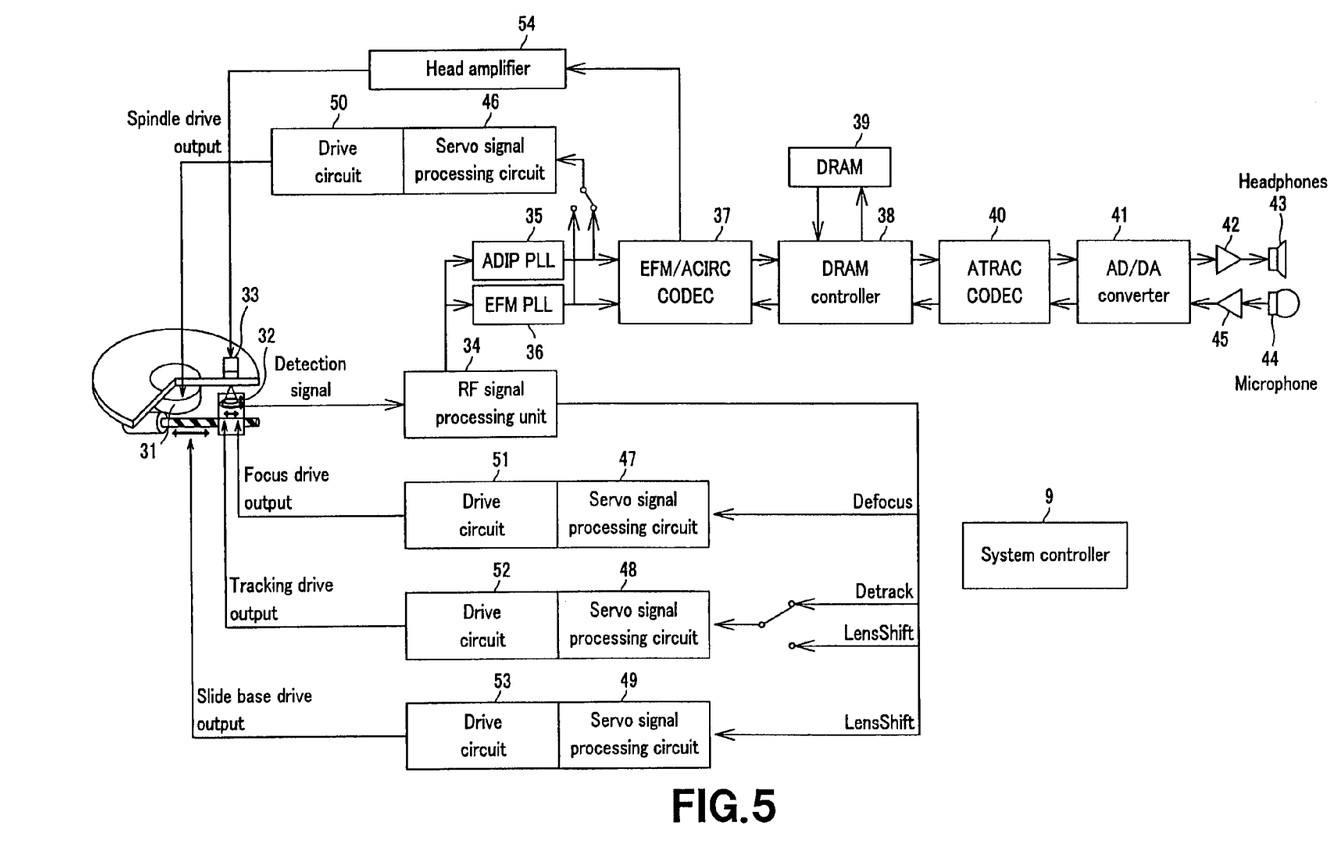
FIG. 5 is a diagram which depicts the configuration of a media drive unit of the contents recording/reproducing apparatus.
Figure 6:
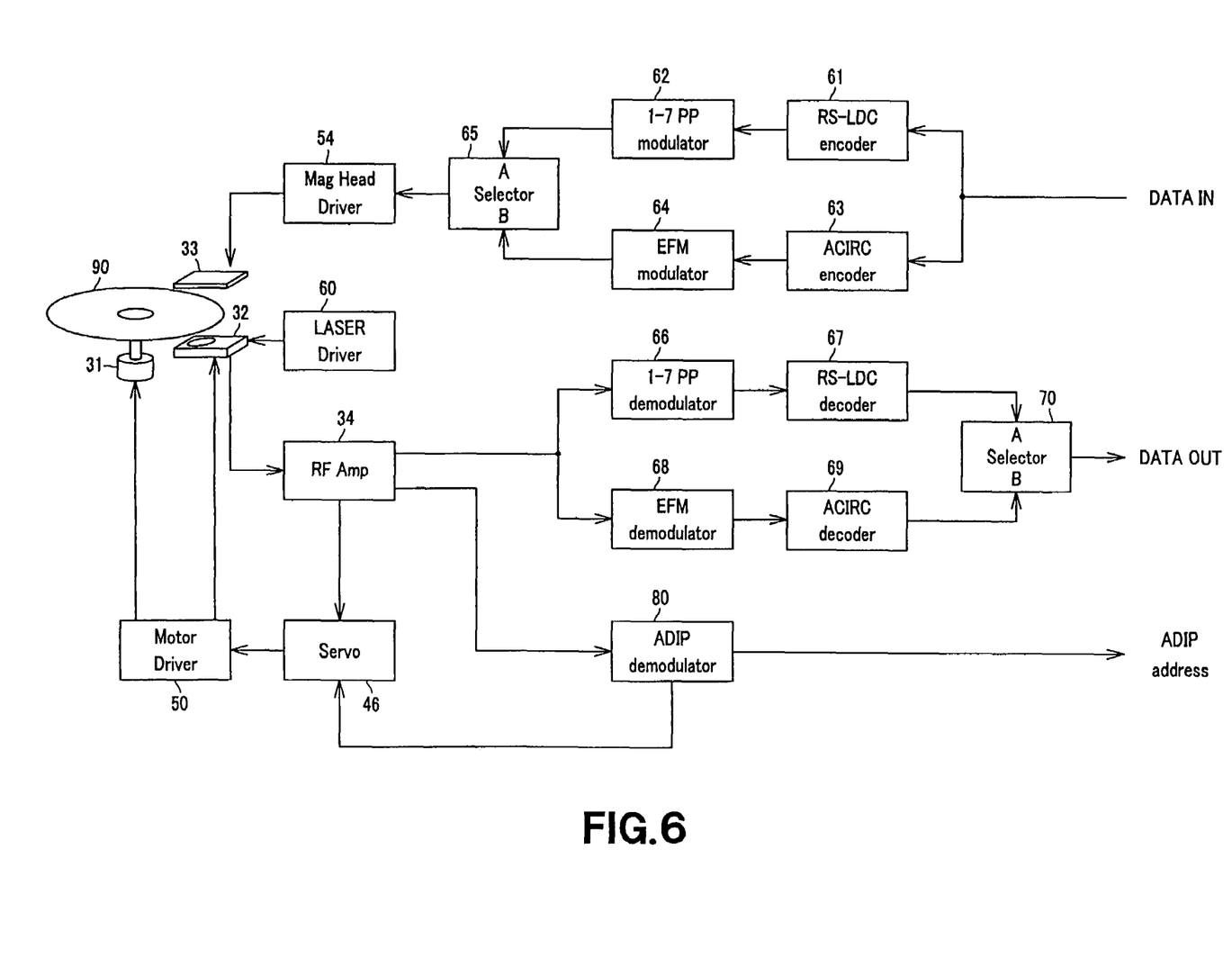
FIG. 6 is a diagram which depicts the configuration of a storage unit of the contents recording/reproducing apparatus.

To deal with next-generation discs as described above, the contents recording/reproducing apparatus 1 according to the present embodiment as shown in FIG. 4 has a storage unit constructed as shown in FIG. 6, as the recording/reproducing unit 4, to record/reproduce data. This unit is constructed by modifying a part of the contents recording/reproducing apparatus 1 which records/reproduces audio data on/from mini discs. The same blocks as shown in FIG. 5 will be denoted at identical reference numerals, and descriptions of those blocks will be omitted herefrom.

The recording/reproducing unit 4 shown in FIG. 6 is replaced with the recording/reproducing unit 4 which is constituted by the spindle motor 31, optical head 32, magnetic head 33, RF signal processing unit 34, ADIP_PLL circuit 35, EFM_PLL circuit 36, EFM/ACIRC coding demodulation unit (EFM/ACIRC CODEC) 37, servo signal processing circuit 46, servo signal processing circuits 47, 48, and 49, drive circuits 50, 51, 52, and 53, and the magnetic head driver 54 of the contents recording/reproducing apparatus 1 shown in FIG. 5.

In FIG. 6, a loaded disc 90 is driven and rotated according to the CLV system by the spindle motor 31, in the recording/reproducing unit 4. A laser beam is irradiated on the disc 90 from the optical head 32 during recording/reproducing.

In this case, a disc having currently existing MD specs, a disc having first next-generation MD specs, or a disc having second next-generation MD specs can be loaded as a disc 90. The linear velocity hence differs depending on the discs.

The spindle motor 31 is therefore rotated at different linear velocities respectively corresponding to the types of discs 90 loaded.

The optical head 32 outputs a laser beam of a high level to heat the recording track to the Curie temperature during recording. During reproducing, the optical head 32 outputs a laser beam of a relatively low level to detect data from reflection light, based on the magnetic Kerr effect. Therefore, the optical head 32 is provided with a laser diode as a laser output means, a polarizing beam splitter, an optical system including an objective lens and the like, and a detector for detecting reflection light, although not shown in the figures. The objective lens provided in the optical head 32 is held to be able to shift in the radial direction of the disc and in directions in which the lens moves up to and apart from the disc, for example, by a two-axle mechanism.

A magnetic head 33 is provided at the position opposed to the optical head 32 with the disc 90 interposed therebetween. The magnetic head 33 applies a magnetic field modulated according to data to be recorded, to the disc 90.

Although not shown in the figures, a thread motor and a thread mechanism are provided to move the whole optical head 32 and magnetic head 33 in the radial direction of the disc.

In case of second next-generation MD discs, the optical head 32 and magnetic head 33 can perform pulse drive magnetic field modulation, to form very small marks. In case of currently existing MD discs and first next-generation MD discs, a magnetic field modulation system is adopted.

The present recording/reproducing unit 4 is provided with a recording processing system, a reproducing processing system, a servo system, and the like, in addition to the recording/reproducing head system based on the optical head 32 and the magnetic head 33, and the disc drive rotation system based on the spindle motor 31.

The recording processing system is provided with a section which records data by performing error correction coding according to the ACIRC and by performing EFM-modulation during recording of an audio track in case of a disc of the currently existing MD system, and a section which records data by performing error correction coding according to a system combining the BIS and LDC and by performing 1-7 pp modulation in case of the first or second next-generation MD disc.

The reproducing processing system is provided with a section which performs EFM demodulation and error correction processing according to the ACIRC during reproducing from a disc of the currently existing MD system, and a section which performs 1-7 pp demodulation based on data detection using partial response and the Viterbi decoding and performs error correction processing based on the BIS and LDC during reproducing from a disc of the first or second next-generation MD system.

There are also provided a section which decodes addresses based on ADIP signals of the currently existing MD system and the first next-generation MD, and a section which decodes ADIP signals of the second next-generation MD.

Information detected as reflection light of the laser beam irradiated on the disc 90 from the optical head 32 (e.g., a photo-electric current obtained by detecting laser reflection light with use of a photo-detector) is supplied to an RF amplifier 34.

The RF amplifier 34 performs current/voltage conversion, amplification, matrix calculation, and the like on the inputted detection information. Thus extracted are reproducing RF signals as reproducing information, tracking error signals TE, focus error signals FE, groove information (ADIP information recorded on the disc 90 by track-wobbling), and the like.

When data is reproduced from a disc of the currently existing MD system, the reproducing RF signals obtained by the RF amplifier are processed by an EFM demodulation unit 68 and ACIRC decoder 69.

That is, the reproducing RF signals are binarized by the EFM demodulation unit 68 into EFM signal strings and are then subjected to EFM demodulation. Further, error correction and deinterleave processing are carried out by the ACIRC decoder 69. At this time point, the data are in form of ATRAC-compressed data at this time point.

When data is thus reproduced from the disc of the currently existing MD system, the selector 70 is switched to the side of the connection node B, and the demodulated ATRAC-compressed data is outputted as reproducing data from the disc 90.

On the other side, when data is reproduced from a disc of the first or second next-generation MD, reproducing RF signals obtained by the RF amplifier 34 are processed by an RLL (1-7) PP demodulation unit 66 and an RS-LDC decoder 69. That is, the reproducing RF signals are subjected to data detection using PR (668) ML or PR (1, 1) ML and the Viterbi decoding in the RLL (1-7) PP demodulation unit 66, to obtain reproducing data as RLL (1-7) code strings. These RLL (1-7) code strings are subjected to RLL (1-7) demodulation processing. Further, the RS-LDC decoder 67 performs error correction and deinterleave processing.

When data is thus reproduced from the disc of the first or second next-generation MD, the selector 70 is switched to the side of the connection node A, and the demodulated data is outputted as reproducing data from the disc 90.

Tracking error signals and focus error signals outputted from the RF amplifier 34 are supplied to a servo circuit 46. Groove information is supplied to an ADIP demodulation unit 80.

The ADIP demodulation unit 80 limits the band range of the groove information by a band pass filter, to extract wobble components. The ADIP demodulation unit 80 then performs FM demodulation and bi-phase demodulation, to demodulate ADIP signals.

The demodulated ADIP addresses which are absolute address information on the disc are supplied to the control unit 9 as shown in FIG. 1. The control unit 9 executes necessary control processing, based on the ADIP addresses.

The groove information is supplied to the servo signal processing circuit 46 for spindle servo control.

The servo signal processing circuit 46 generates, for example, a spindle error signal for CLV servo control, based on an error signal obtained by integrating phase errors (or differences) from the reproducing clock (a PLL-based clock during decoding), with respect to groove information.

The servo signal processing circuit 46 also generates various servo control signals (tracking control signals, focus control signals, thread control signals, spindle control signals, etc.), based on spindle error signals, tracking error signals and focus error signals supplied from the RF amplifier 34, or track jump commands, access commands, and the like from the control unit 9. The circuit 46 then outputs those servo control signals to a motor driver 50. That is, the motor driver 50 performs necessary processings such as a phase compensation processing, gain processing, target value setting processing, and the like, on the servo error signals or commands as described above, to generate various servo control signals.

The motor driver 50 generates necessary servo drive signals, based on the sieve control signals supplied from the servo circuit 46. These servo drive signals are two-axle drive signals (of two kinds, i.e., in the focusing direction and in the tracking direction) for driving the two-axle mechanism, a thread motor drive signal for driving the thread mechanism, and a spindle motor drive signal for driving the spindle motor 31.

By these servo drive signals, the focus control and tracking control are performed with respect to the disc 90, as well as the CLV control with respect to the spindle motor 31.

When audio data is recorded on a disc of the currently existing MD system, the selector 65 is connected to the connection node B, so an ACIRC encoder 63 and an EFM modulation unit 64 function.

In this case, compressed data supplied as recording data from the buffer memory 16 shown in FIG. 4 is subjected to interleaving and addition of error correction codes by the ACIRC encoder 63 and is thereafter subjected to EFM modulation by the EFM modulation unit 64.

Then, the EFM-modulated data is supplied to the magnetic head driver 54 through the selector 65. The magnetic head 33 applies a magnetic field to the disc 90, based on the EFM-modulated data, to thereby record an audio track.

In contrast, when data is recorded on a disc of the first next-generation MD or second next-generation MD2, the selector 65 is connected to the connection node A, so an RS-LDC encoder 61 and an RLL (1-7) PP modulation unit 62 function. In this case, high-density data from the buffer memory 16 is subjected to interleaving and addition of error correction codes according to the RS LCD system, by the RS-LDC encoder 61. Thereafter, the RLL (1-7) PP modulation unit 62 performs RLL (1-7) modulation.

Further, recording data as RLL (1-7) code strings is supplied to the magnetic head driver 54 via the selector 65, and the magnetic head 33 applies a magnetic field based on the modulated data, to the disc 90. Thus, a data track is recorded.

A laser driver/APC 60 makes a laser diode execute a laser beam emission operation during reproducing and recording as described above. The laser driver/APC 60 also performs APC (Automatic Laser Power Control) operation.

That is, although not shown in the figures, a detector for monitoring the laser power is provided in the optical head 32, and a monitor signal therefrom is fed back to the laser driver/APC 60. The laser driver/APC 60 compares the current laser power which is obtained as a monitor signal, with a preset laser power, and reflects the difference between the current and preset laser powers on the laser drive signals. Thus, the laser power outputted from the laser diode is controlled to be stable at a setting value.

Concerning the laser power, values of a reproducing laser power and a recording laser power are set in a register in the laser driver/APC 60.

The operations as described above (e.g., the access operation, various servo operations, data write operation, and data read operation) are executed based on instructions from the control unit 9 shown in FIG. 1.

Figure 7:
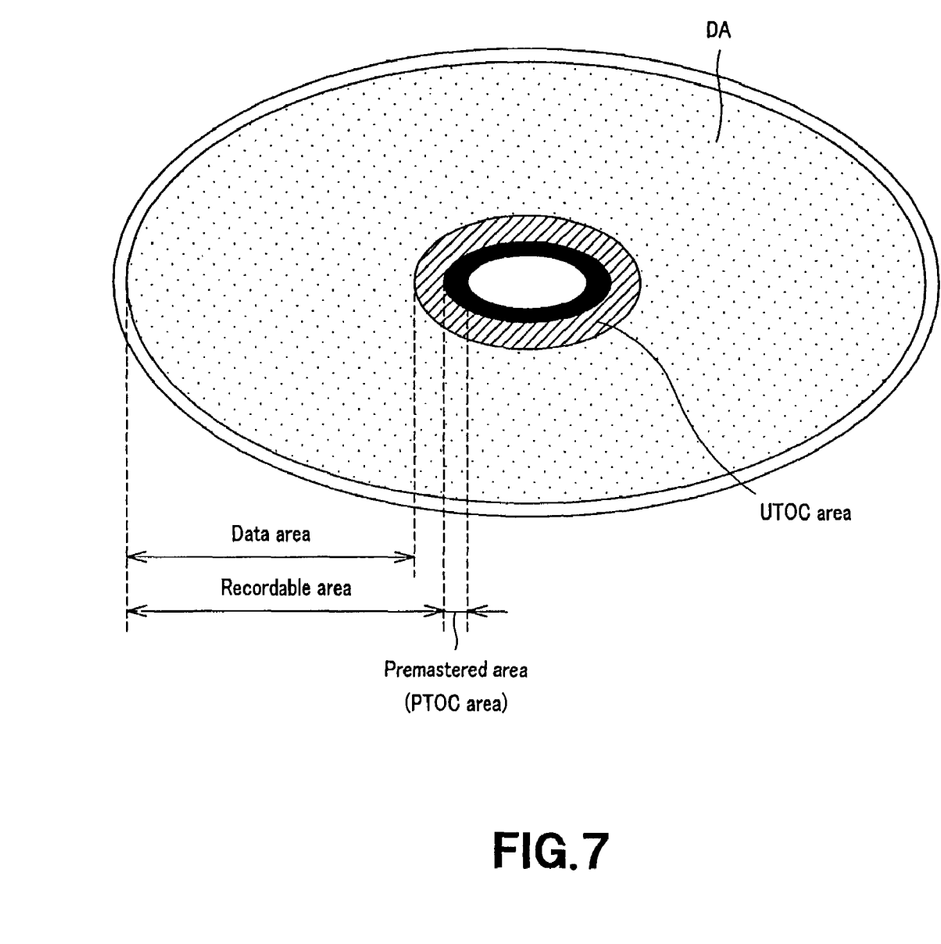
FIG. 7 is a view schematically showing an example of the area structure of the disc surface of a mini disc on/from which data are recorded/reproduced by the contents recording/reproducing apparatus.
Figure 8:
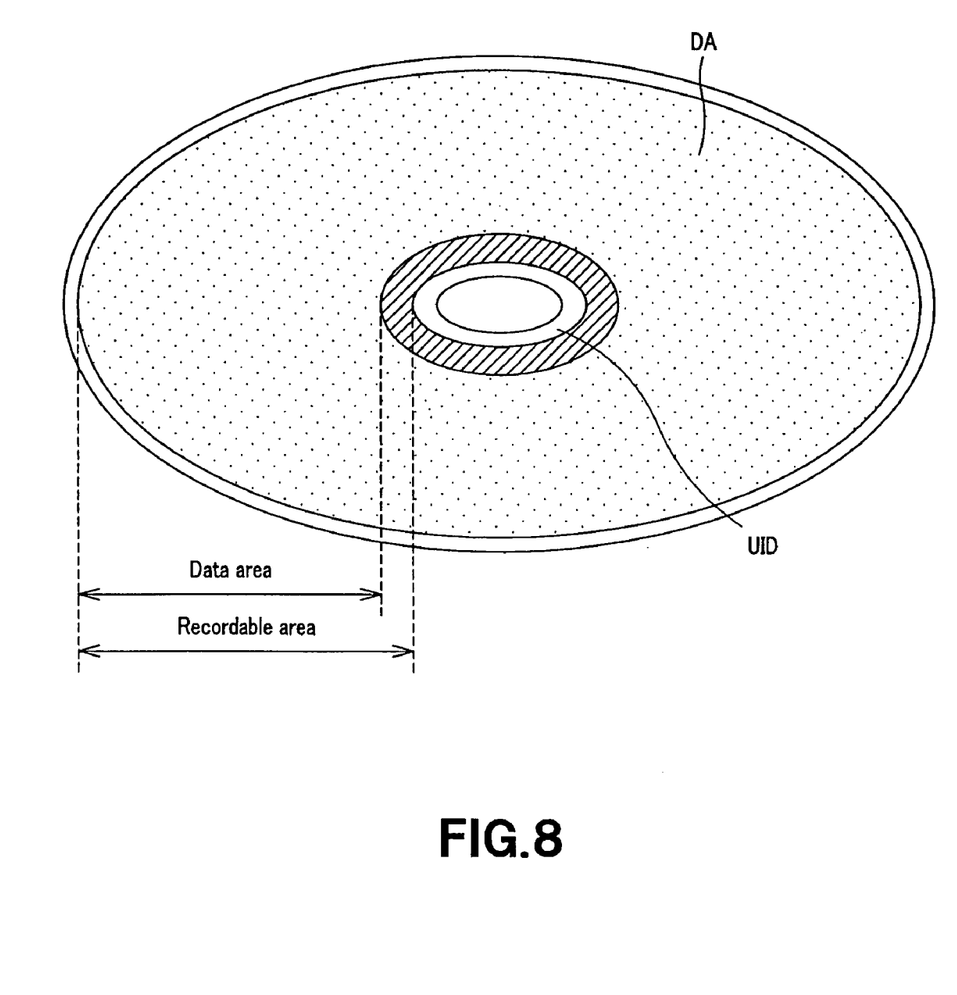
FIG. 8 is a view schematically also showing an example of the area structure of the disc surface of a mini disc on/from which data are recorded/reproduced by the contents recording/reproducing apparatus.

FIGS. 7 and 8 schematically show examples of the area structure of the disc surface of a mini disc 90 shown in the present embodiment. In the innermost peripheral side of the mini disc 90, PTOC (Premastered Table Of Contents) are provided as a premastered area. On this area, disc management information is recorded as embossed pits. A magneto-optically recordable area is provided outside the premastered area. On this area, a groove as a guide groove to a recording track is formed. In the innermost peripheral side of this recordable area, a UTOC (User Table Of Contents) area where UTOC information is written is provided. In this UTOC area, there are provided a buffering area for the premastered area and a power calibration area used to adjust the output power of the laser beam.

As shown in FIG. 8, the mini disc 90 does not use pre-pits to achieve a high-density. Therefore, no PTOC area is provided in a mini disc which adopts a signal system different from recording formats which are conventionally used as recording/reproducing systems of mini discs which adopt a conventional magneto-optical recording system. The mini disc 90 in the present case is provided with a unique ID area (UID) in the inner peripheral area inside the recordable area, in order to record information for protecting copyrights, information for checking alterations to data, and other not-open information. The UID area adopts a recording system different from the DWDD system which the mini disc 90 adopts.

Figure 9:
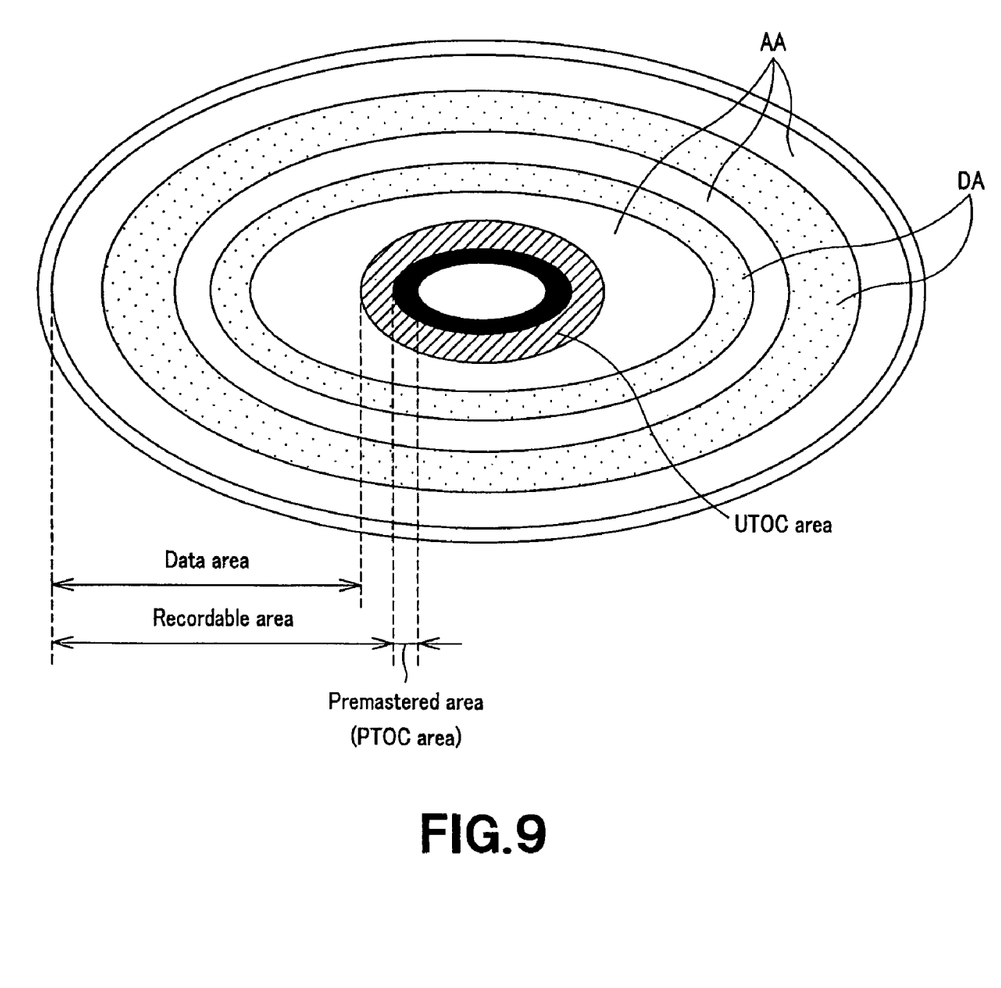
FIG. 9 is a view schematically showing the area structure of the disc surface of the mini disc where audio data and PC data are recorded, mixed together.

On each of the discs described above, audio tracks for music data and data tracks may be recorded mixed together. In this case, as shown in FIG. 9, an audio recording area AA where at least one audio track is recorded, and a PC data recording area DA where at least one data track is recorded are formed at arbitrary positions.

According to the contents recording/reproducing apparatus 1 described above, link information allows image data based on general-purpose formats such as JPEG, GIF, TIFF, and the like to be linkable only to data in the formats of ATRAC system, ATRAC3 system, and ATRAC3 plus system. Linking to audio data in the other formats than MP3, WMA, and ATRAC formats and to image data is not allowed. Therefore, data can be recorded/reproduced, at least based on the same compression-coding format as that of the contents recording/reproducing apparatus 1. In addition, compatibility of a file which links image data to music data is guaranteed among devices which can reproduce data from a mini disc having a secret area. Copyright protection is thus achieved, concerning music data and information linked to music data.

The above description has been made, exemplifying image files as having data formats allowed to be linkable to audio data. However, the present invention is not limited thereto. As another example, if audio data are music data, information concerning lyrics of songs can be displayed during reproducing audio data. Thus, text data files may be information to be reproduced linked with audio data.

At present, audio data formats which are allowed to be linkable with image data by link information are limited to those of audio data recorded on a secret area, which can be encoded and decoded according to systems of the ATRAC-family. However, the link information memory 10 shown in FIG. 4 may be used as a rewritable non-volatile memory, so that the audio formats which are linkable to images and recorded on the secret area of a recording medium 90 can be increased or deleted. In this case, application software for updating link information is installed in the PC 100, and the PC 100 and the control unit 9 authenticate each other via the USB hub 18 and USB interface 20. Thereafter, the control unit 9 receives link information from the PC 100 and updates a link table stored in the link information memory 10. Alternatively, for example, a recording medium 90 which records data for updating the link information memory 10 is loaded in the contents recording/reproducing apparatus 1. Validity of update data reproduced by the recording/reproducing unit 4 is evaluated by the control unit 9. Then, the update data evaluated to be valid is used to update link information stored in the link information memory 10.

Since linkable audio formats can thus be updated, audio files encoded in an AAC-type audio format can be recorded on a secret area in the future. Linking between image data recorded on a normal recording area and audio data in the AAC format can be achieved accordingly.

In the present invention, files which are mutually linkable according to link information are specified, and one of the specified files is recorded on a particular area of a recording medium, so that the one of the specified files is treated, distinguished from the other files. Therefore, the present invention is not limited to the case of dealing with the ATRAC format in a disc having a secret area and a normal recording area but is applicable to any recording/reproducing apparatus for recording media in each of which particular data is recorded on a particular area.

Examples of practical use will be as follows. In one case, image data of a material presented in a presentation is linked to the content of the presentation, sounds of which a user recorded, such that the image data links just at the same timing as the material was presented in the presentation. In another case, actual pronunciation is recorded as audio data for a language learning material, and an example of a sentence is displayed as a linked image at predetermined timing.

What is claimed is:

1. A reproducing apparatus which reproduces data from a recording medium having a first area where audio data encoded by a predetermined encoding system is recorded and a second recording area where recording data is recorded, the apparatus comprising:

reading means for reading data recorded on the recording medium;

decoding means for decoding audio data encoded by the predetermined encoding system;

storage means for storing an encoding format of the audio data recorded on the first recording area and a data format of the data recorded on the second recording area, with the encoding format and the data format being linked to each other, and with the data recorded on the second area being allowed to be reproduced with respect to the encoding format when the audio data recorded on the first recording area is reproduced; and control means for reading the encoding format of the audio data only when the audio data read from the recording medium is read from the first recording area, with the data recorded on the second area being allowed to be reproduced during reproducing of the audio data, and reading and reproducing, from the second area, the data linked to the audio data read from the first area if the audio data is audio data for which the data recorded on the second recording area is allowed to be reproduced during reproducing of the audio data.

2. The reproducing apparatus according to claim 1, wherein the audio data recorded on the first recording area is encrypted and recorded.

3. The reproducing apparatus according to claim 1, wherein the data reproduced from the second recording area and linked to the reproducing of the data recorded on the first recording area is image data.

4. A reproducing method of reproducing data from a recording medium having a first recording area where audio data encoded by a predetermined encoding system is recorded and a second recording area where recording data is recorded, the method comprising:

a step of detecting an encoding system of specified audio data only when reproducing of audio data from the first recording area is specified;

a step of determining whether or not the recording data recorded on the second recording area is allowed to be reproduced linked with reproducing of the audio data recorded on the first recording area, with respect to the detected encoding system; and a step of reproducing the specified audio data from the first recording area and reproducing the recording data recorded on the second recording area, linked with the reproducing of the audio data, if it is determined that the recording data recorded on the second recording area is allowed to be reproduced linked with the reproducing of the audio data recorded on the first recording area, with respect to the detected encoding system.

5. The reproducing method according to claim 4, wherein the audio data recorded on the first recording area is encrypted according to a predetermined encryption system.

6. The reproducing method according to claim 4, wherein the recording data, which is reproduced linked with the reproducing of the audio data recorded on the first recording area from the second recording area, is image data.

7. The reproducing method according to claim 4, wherein the reproducing of the recording data from the second recording area, linked with the reproducing of the audio data recorded on the first recording area, is carried out on the basis of relevant information recorded on the recording medium.

8. A reproducing apparatus which reproduces data recorded on a first recording area in a recording medium having the first recording area where audio data encoded by a predetermined encoding system is recorded, a second recording area where recording data is recorded and audio data can be recorded, and a management data recording area where management data which manages recording on the first recording area and the second recording area, the apparatus comprising:

reading means for reading, from the recording medium, the management data and recording data recorded on the recording medium;

audio decoding means for decoding the audio data read from the first recording area;

image data decoding means for decoding image data read from the second recording area;

storage means for storing a decoding system of the audio data recorded on the first recording area, with the audio data of the decoding system allowed to be reproduced while the image data recorded on the second recording area is decoded and reproduced by the image data decoding means; and control means for performing control to read, decode, and reproduce the audio data recorded on the first recording area by the audio decoding means when the image data recorded on the second recording area is reproduced, only if the storage means instructs reproducing of audio having the audio data format which is allowed to be reproduced during the reproducing of the image data.

9. A recording method of recording, on a recording medium, audio data and relevant data which is reproduced in synchronization with reproducing of the audio data, comprising:

a step of recording inputted audio data on a predetermined first recording area of the recording medium when audio data encoded by a predetermined encoding format is inputted;

a step of determining whether or not the encoding system applied to the audio data recorded on the first recording area is allowed be linked to recording data recorded on a second recording area different from the first recording area; and a step of linking the audio data recorded on the first recording area to the recording data recorded on the second recording area, wherein when the inputted audio data is recorded on the second recording area, the inputted audio data is prevented from being linked to the recording data recorded on the second recording area.

10. The recording method according to claim 9, wherein allowance for the linking is read from a memory.

11. The recording method according to claim 9, further comprising a step of recording, on the recording medium, link data which links the audio data recorded on the first recording area to the recording data recorded on the second recording area.

* * * * *